(12) United States Patent  
Hugosson et al.

(10) Patent No.: US 8,473,717 B2  
(45) Date of Patent: Jun. 25, 2013

(54) COPROCESSOR RESET CONTROLLER WITH QUEUE FOR STORING CONFIGURATION INFORMATION OF SUBSEQUENT SESSIONS PRIOR TO COMPLETION OF CURRENT SESSION

(75) Inventors: Ola Hugosson, Lund (SE); Erik Persson, Lund (SE); Pontus Borg, Lund (SE)

(73) Assignee: ARM Limited, Cambridge (GB)

( * ) Notice: Subject to any disclaimer, the term of this patent is extended or adjusted under 35 U.S.C. 154(b) by 713 days.

(21) Appl. No.: 12/656,570

(22) Filed: Feb. 3, 2010

(65) Prior Publication Data

US 2011/0191539 A1 Aug. 4, 2011

(51) Int. Cl.  
 *G06F 9/40* (2006.01)

(52) U.S. Cl.  
 USPC ................................................. 712/34; 713/1

(58) Field of Classification Search  
 None  
 See application file for complete search history.

(56) References Cited

U.S. PATENT DOCUMENTS 5,923,892 A * 7/1999 Levy ............................... 712/31  
7,953,221 B2 * 5/2011 Feghali et al. ................. 380/28

OTHER PUBLICATIONS

Summit Microelectronics, "SMR101 Programmable Reset Controller", *MobileGreen Technologies*, downloaded Nov. 24, 2009, www.summitmicro.com/prod_select/summary/SMR101/SMR101.htm, 2 pages.  
AT91 Reset Considerations, AT91 ARM Thumb Microcontrollers, *ATMEL*, Jul. 2002, pp. 1-19.

* cited by examiner

*Primary Examiner* — Kenneth Kim  
(74) *Attorney, Agent, or Firm* — Nixon & Vanderhye P.C.

(57) ABSTRACT

A data processing apparatus is provided, configured to carry out data processing operations on behalf of a main data processing apparatus, comprising a coprocessor core configured to perform the data processing operations and a reset controller configured to cause the coprocessor core to reset. The coprocessor core performs its data processing in dependence on current configuration data stored therein, the current configuration data being associated with a current processing session. The reset controller is configured to receive pending configuration data from the main data processing apparatus, the pending configuration data associated with a pending processing session, and to store the pending configuration data in a configuration data queue. The reset controller is configured, when the coprocessor core resets, to transfer the pending configuration data from the configuration data queue to be stored in the coprocessor core, replacing the current configuration data.

26 Claims, 7 Drawing Sheets

COPROCESSOR RESET CONTROLLER WITH QUEUE FOR STORING CONFIGURATION INFORMATION OF SUBSEQUENT SESSIONS PRIOR TO COMPLETION OF CURRENT SESSION

TECHNICAL FIELD

The present invention relates to data processing systems in which a coprocessor is provided to perform data processing operations on behalf of a main data processing apparatus. More particularly, this invention relates to the requirement to reset such a coprocessor between processing tasks.

BACKGROUND

It is known for at least one coprocessor to be provided in a contemporary data processing system, wherein the coprocessor is configured to perform data processing operations on behalf of a main (or "host") processor. The main processor maintains overall control of the data processing system, but delegates specific tasks to one or more coprocessors. Typically such coprocessors will have a dedicated function in the data processing system, for which they are explicitly designed and optimised, such that they may carry out the tasks delegated to them by the main processor with great efficiency. Known examples of such coprocessors are a video engine configured to handle the processing of video data and a direct memory access unit (DMA) configured to handle memory accesses (in particular translating between virtual addresses and physical addresses by means of a memory management unit). Furthermore, it is known for such coprocessors to be arranged in a nested fashion, wherein a coprocessor itself may have dedicated components for performing specific tasks within it, such as hardware accelerators, microcontrollers and so on.

A given coprocessor may be allocated tasks to carry out on behalf of the main processor for which different configurations of the coprocessor are necessary. For example, in a given processing session the MMU used by a coprocessor may be configured with a certain page table base address indicating the location in memory of the page table storing the mappings between virtual addresses used in that processing session and the corresponding physical addresses in memory. These mappings may be important because they can define security boundaries in the system, allowing one processing session access to a particular area of memory, whilst hiding that area of memory from another processing session. For this reason, when one processing session ends (or indeed crashes) it is necessary for the main processor to reset the coprocessor, so that the configuration of the MMU is such that the next processing session has the correct view of memory, and is not allowed to see a view of memory intended only for the previous processing session. Other configuration data of the coprocessor may also need to be reset, as well as clearing temporarily stored data such as the contents of local caches.

FIG. 1 schematically illustrates such a data processing system 100, comprising host processor 105, coprocessor 110 and system memory 115. The coprocessor 110 can be seen to comprise a set of coprocessor engines 120 and an MMU 125. Coprocessor engine 120 comprises a hardware accelerator 130, a microcontroller 135 and a DMA unit 140. The coprocessor engine 120 accesses system memory 115 via MMU 125. The configuration of MMU 125 (defined in configuration registers 145) is determined by host processor 105, which writes the required configuration data into the configuration registers 145. This enables the host processor to maintain control over the view of system memory 115 that each of the coprocessor engines 120 has. In particular, host processor 105 writes a different page table base address into one of the configuration registers 145, depending on the processing session being carried out by coprocessor 110. MMU 125 further comprises a translation look aside buffer (TLB) 150, which caches translations between virtual addresses and physical addresses previously made by the MMU 125. The MMU 125 has previously retrieved those translations from the page table in system memory 115 indicated by the page table base address stored in configuration registers 145. When coprocessor 110 completes a processing session, and will be required to start another processing session, host processor 105 issues a reset signal ("RESET"), which causes the coprocessor engines 120 to flush their local caches (and any other session specific information) and causes MMU 125 to flush TLB 150. Host processor 105 writes a new set of MMU configuration data into the configuration registers 145, in particular writing a new page table base address appropriate for the next processing session. Coprocessor 110 can then begin the next processing session.

However, whilst the above described arrangement allows the host processor to ensure that the coprocessor has the correct view of the system memory depending on the processing session being carried out by the coprocessor, this arrangement can result in undesirable delays between processing sessions on the coprocessor, as is now described with reference to FIG. 2. In order to set up a first processing session on the coprocessor, the host issues a set of signals 200, comprising a reset signal, the required MMU configuration data, and a signal to start the processing session. The coprocessor then performs its processing 210, at the end of which it signals to the host (e.g. an interrupt signal IRQ) that it has finished processing. There will then follow a latency delay 220 whilst the host reacts to the signal indicating that the first processing session has finished and then performs the same sequence of actions 230 to set up a second processing session on the coprocessor, namely a reset signal, MMU configuration data and a start processing signal. The coprocessor then begins its second processing session 240. It can be seen from FIG. 2 that due to the turn-around latency 220 and the time 230 required to set up the second processing session on the coprocessor, there is a period between the first processing session 210 and the second processing session 240 in which the coprocessor is idle A similar delay is also apparent in the situation where a first processing session on the coprocessor crashes. In this situation, it is necessary for the host processor to have some mechanism for recognising that the first processing session has crashed (e.g. the absence of some update data or a time out), following which the host processor must respond to the recognition that the first coprocessing session has crashed, and perform the same set of actions (reset, new MMU configuration data and start processing) as described above.

It is further known for a coprocessor to be provided with a reset controller associated with the coprocessor, which the host processor can instruct to cause the coprocessor to reset or which software on the coprocessor can interact with and thereby request a reset. Examples of such reset controllers are that discussed in the document "AT91 Reset Considerations" (available at http://www.atmel.com/dyn/resources/prod_documents/DOC2645.PDF) and the SMR101 programmable reset controller (more information available at http://www.summitmicro.com/prod_select/summary/SMR101/SMR101.htm).

However, when such reset controllers initiate a reset of coprocessor components it is still necessary for the host processor to be responsible for setting up a new configuration of the coprocessor for its next processing session, which will involve the above-discussed delay.

It would be desirable to provide an improved technique for handling the resetting of a coprocessor, in a particular when the coprocessor switches from one processing session to a next processing session.

SUMMARY

Viewed from a first aspect, the present invention provides a data processing apparatus configured to carry out data processing operations on behalf of a main data processing apparatus, said data processing apparatus comprising: a coprocessor core configured to perform said data processing operations, in dependence on current configuration data stored in said coprocessor core, said current configuration data being associated with a current processing session; and a reset controller configured to cause said coprocessor core to reset, wherein said reset controller is configured to receive pending configuration data from said main data processing apparatus, said pending configuration data associated with a pending processing session, and to store said pending configuration data in a configuration data queue, and wherein said reset controller is configured, when said coprocessor core resets, to transfer said pending configuration data from said configuration data queue to be stored in said coprocessor core, replacing said current configuration data.

Accordingly a data processing apparatus is provided which is configured to carry out data processing operations on behalf of a main data processing apparatus. Conventionally the main data processing apparatus may be termed a host processor and the data processing apparatus configured to carry out data processing operations on its behalf is termed a coprocessor. The data processing apparatus (coprocessor) comprises a coprocessor core and a reset controller. The coprocessor core is configured to perform the data processing operations in dependence on configuration data stored in the coprocessor core and associated with a current processing session of the coprocessor. The configuration data configuring the coprocessor core to perform data processing operations is termed current configuration data. This current configuration data determines how the coprocessor core operates, for example how it responds to instructions given to it by the host processor, which areas of memory it may access, what permissions it has and so on. The reset controller is configured to cause the coprocessor core to reset. In other words, the reset controller can determine when the coprocessor core resets.

The inventors of the present invention realised that the manner in which resetting of the coprocessor core is handled could be improved by providing the reset controller with a configuration data queue in which pending configuration data associated with a pending processing session of the coprocessor is stored, having been received from the main data processing apparatus (the host processor). The reset controller is configured to transfer this pending configuration data from the configuration data queue when the coprocessor core resets, so that the pending configuration data is stored in the coprocessor core, replacing the current configuration data.

The provision of a configuration data queue in the reset controller advantageously means that the control over the configuration of the coprocessor on a processing session by processing session basis is retained by the host processor, yet by having this configuration data already queued up in the configuration data queue of the reset controller is it immediately available for reconfiguring the coprocessor core for a next processing session when the current processing session finishes (or indeed crashes).

Hence, this arrangement provides that the latency associated with the coprocessor signalling to the host processor the first processing session has completed, the host processor issuing reset and reconfiguration commands, that reconfiguration being implemented, and the second processing session commencing, can be greatly reduced. Furthermore, if a first processing session crashes, configuration data for recommencing a new processing session of the coprocessor is directly available.

In some embodiments said current configuration data comprises a current page table base address, and said coprocessor core comprises a memory management unit configured to perform a translation of a virtual address issued by said coprocessor core into a physical address for accessing memory, said translation being performed in dependence on said current page table base address stored in a configuration register of said memory management unit, and said pending configuration data comprises a pending page table base address.

The page table base address stored in a configuration register of a memory management unit in the coprocessor core represents an item of configuration data which it is particularly useful for the host processor to control and to reconfigure from one processing session to the next. The translation of the virtual address issued by the coprocessor core into a physical address for accessing memory is performed in dependence on the current page table base address stored in a configuration register of the memory management unit, and hence the page table base address determines what translations from virtual to physical addresses will be carried out. In particular, by virtue of the particular set of physical addresses into which virtual addresses maybe translated, the page table base address determines the view of memory that each processing session on the coprocessor is allowed to see. Hence, according to techniques of the present invention, the host processor can maintain control of which areas of memory a particular processing session on the coprocessor is allowed to see, whilst greatly reducing the necessary delays between the end of one processing session and the beginning of the next.

According to some embodiments, the configuration data queue may only be arranged to store one set of pending configuration data. Since the time required to reset and reconfigure the coprocessor to start a new processing session is typically much shorter than the time for which the coprocessor will be carrying out each processing session, it is sufficient for the configuration data queue to only be configured to store one set of pending configuration data (i.e. the queue has a depth of one). However, in some embodiments, said configuration data queue is configured to store a sequence of pending configuration data. According to this arrangement more than one set of pending configuration data may be queued up the configuration data queue in the reset controller. This means that the host processor can configure more than one processing session on the coprocessor in advance, leaving these sessions to be carried out by the coprocessor one after another. Also, in situations where each processing session on the coprocessor is rather short, this is particularly advantageous.

In some embodiments after being reset said coprocessor core is configured to begin said pending processing session, using said pending configuration data as new current configuration data. In other words, the coprocessor core will immediately start the pending processing session, without waiting for a further indication from the host processor that the pending processing session should begin. This further reduces the latency between processing sessions.

It will be appreciated that the pending configuration data may comprise various items of data useful for configuring the coprocessor core for a new processing session, such as the page table base address as described above, but according to one embodiment said pending configuration data comprises a pending program counter for initialising said pending processing session. A pending program counter may be used by the coprocessor core to indicate the first instruction which the coprocessor core should execute to begin the new processing session. In some embodiments, said configuration data comprises further memory management unit configuration data. Such further memory management unit configuration data may for example comprise access permissions indicating which regions of memory the coprocessor core will be allowed to access during the new processing session, or other information used by the memory management unit to decode the page tables.

In some embodiments, said reset controller is configured to cause coprocessor state associated with said current processing session to be flushed when said coprocessor is reset. When switching from a current processing session to a pending processing session, there may be various items of coprocessor state associated with the current processing session which it is undesirable to allow the pending processing session access to when it begins. In order to maintain isolation between coprocessing sessions it is therefore advantageous for such coprocessor state to be flushed when the coprocessor is reset.

It will be appreciated that this coprocessor state which is flushed when the coprocessor is reset could take a number of forms, but in embodiments where the coprocessor core comprises a memory management unit, said reset controller may be configured to cause content of an internal storage unit in said memory management unit to be flushed when said coprocessor is reset, said internal storage unit configured to store indications of virtual to physical address translations previously performed by said memory management unit. Such an internal storage unit (for example a translation lookaside buffer (TLB)) will cache previously used indications of virtual to physical address translations performed by the memory management unit (such that these do not need to be repeatedly fetched from the page table in memory). Since these translations are associated with a particular processing session, in order to maintain isolation between processor session, it is advantageous to flush the content of the internal storage unit in the memory management unit when the coprocessor is reset. In some such embodiments the coprocessor state may comprise the content of a coprocessor cache. The coprocessor may be provided with a various caches which enable it to operate more quickly by locally caching data items. These will generally be associated with a particular processing session, and it is therefore advantageous to flush such caches on reset.

In some embodiments, said data processing apparatus is connected to a bus for data communication and wherein said data processing apparatus further comprises at least one bus transaction terminator, said at least one bus transaction terminator configured, when a reset of said coprocessor is requested, to identify any ongoing bus transactions associated with said current processing session and to terminate said ongoing bus transactions. The connection of the data processing apparatus to a bus provides an efficient and dedicated communication channel with other components of the data processing system. However, it will be recognised that bus transactions on such a bus will take a finite amount of time to complete, for example there will be a finite delay between a read command being issued on the bus and the data thus requested being returned. In such a situation, if the coprocessor is reset after the read command has been issued, but before the requested data is returned, this could cause complications on the bus by leaving this bus transaction half completed. Hence, in these embodiments the data processing apparatus further comprises at least one bus transaction terminator, which is configured, when a reset of the coprocessor is requested, to identify any ongoing bus transactions associated with the current processing session and to terminate them. For example, a bus transaction terminator may be configured to respond to an ongoing read request (requesting data within the coprocessor to be read and returned on the bus) and to send in place of that data an item (or items) of dummy data indicating that the read request is acknowledged, but cannot complete. The at least one bus transaction terminator could take a number of forms, but in one embodiment, said at least one bus transaction terminator comprises a slave bus terminator and a master bus terminator. The data processing apparatus may be configured to operate both as a slave on the bus (for example responding to commands issued by the host processor) and to act as a master on the bus (issuing commands to other components of the data processing system). In this situation it is advantageous to provide a slave bus terminator for terminating ongoing bus transactions in which the data processing apparatus is acting as a slave, and a master bus terminator for terminating ongoing bus transactions in which the data processing apparatus is acting as a master.

In some embodiments in which the data processing apparatus further comprises at least one bus transaction terminator, said reset controller is configured, when said coprocessor is reset, to wait for a termination signal from said at least one bus transaction terminator, said termination signal indicating that all ongoing bus transactions associated with said current processing session have been terminated, before allowing said coprocessor to start said pending processing session. The at least one bus transaction terminator is therefore arranged to issue a termination signal when all ongoing bus transactions associated with the current processing session have been terminated. On receipt of this termination signal the reset controller will allow the coprocessor to start the pending processing session. In this manner, ongoing bus transactions associated with one processing session are ensured to have been properly terminated, and can therefore not interfere with proper execution of, a next processing session.

In some embodiments said reset controller comprises at least one control register accessible to said main data processing apparatus and not accessible to said coprocessor core. Arranging at least one control register in the reset controller to be accessible to the main data processing apparatus and not to be accessible to the coprocessor core provides a mechanism for certain aspects of the reset controller to only be controllable from the main data processing apparatus and not by the coprocessor core. This helps to ensure that the operation of the coprocessor is carried out as the main data processing apparatus expects it to, and cannot be corrupted, for example by malicious code executing on the coprocessor core. The at least one control register could take a number of forms, but in one embodiment, said at least one control register is configured to selectively enable resetting of said coprocessor core. According to this arrangement the choice of whether resetting of the coprocessor core is enabled or disabled may only be made by the main data processing apparatus. In some embodiments, said at least one control register is configured to selectively indicate that said coprocessor core should be reset. Hence this arrangement ensures that only the main data processing apparatus may indicate that the coprocessor core should be reset.

In some embodiments said at least one control register is configured to selectively indicate that said configuration data queue contains at least one set of pending configuration data. By having a control register configured to indicate but the configuration data queue contains at least one set of pending configuration data, it is provided that it can be immediately established whether pending configuration data is waiting to be passed to the coprocessor core, or whether no such configuration data is queued (and, for example, the coprocessor core can be shut down on reset rather then reconfigured).

In some embodiments, said reset controller comprises at least one control register accessible to said coprocessor core. This enables the coprocessor core to have some control over the operation of the reset controller. For example, in one embodiment said at least one control register is configured to selectively indicate that said coprocessor core should be reset. By this mechanism, the coprocessor core may also request that it should be reset. This may advantageously reduce the processing burden on the main data processing apparatus, allowing the coprocessor core (under the right circumstances) to request its own reset, rather then always relying on the main data processing apparatus to control the resets.

In some embodiments said reset controller is configured, if a reset of said coprocessor core is requested and said configuration data queue contains no pending configuration data, to cause said coprocessor core to enter a low power mode. Hence if the coprocessor core should be reset, but there is no pending configuration data, the reset controller causes the coprocessor core to enter a low power mode. This has clear power saving advantages, since if a current processing session ends (or crashes) and no pending processing session is desired, power can be saved by entering a low power (i.e. non-processing) mode. Hence even in situations where no pending processing session is arranged to be immediately started and the coprocessor is about to enter a low power mode, it may be viewed as advantageous to nevertheless reset the coprocessor, providing a further level of isolation between processing sessions.

It will be recognised that the coprocessor core could be configured in a variety of ways, but in some embodiments said coprocessor core comprises at least one of: an accelerator unit, a microcontroller and a direct memory access unit.

It will also be recognised that the data processing apparatus could serve a number of data processing purposes, but in some embodiments said data processing apparatus is a video engine configured to perform video data processing operations.

The data processing apparatus may comprise just a single coprocessor core, but according to some embodiments, said data processing apparatus comprises a plurality of coprocessor cores configured to perform said data processing operations, wherein said reset controller is configured to cause said plurality of coprocessor cores individually to reset. In such embodiments said reset controller may further comprise a dynamic scheduler, said dynamic scheduler configured to transfer said pending configuration data from said configuration data queue to be stored in a next available coprocessor core of said plurality of coprocessor cores.

In some embodiments, as well as being able to be reset by the reset controller, said coprocessor core is further configured to be reset in response to a hardware reset signal not originating from said reset controller. This provided a more direct mechanism, by which a "hard reset" of the coprocessor core may be achieved.

Viewed from a second aspect, the present invention provides a data processing apparatus configured to carry out data processing operations on behalf of a main data processing apparatus, said data processing apparatus comprising: coprocessor core means for performing said data processing operations, in dependence on current configuration data stored in said coprocessor core means, said current configuration data being associated with a current processing session; and reset controller means for causing said coprocessor core means to reset, wherein said reset controller means is configured to receive pending configuration data from said main data processing apparatus, said pending configuration data associated with a pending processing session, and to store said pending configuration data in a configuration data queue means, and wherein said reset controller means is configured, when said coprocessor core means resets, to transfer said pending configuration data from said configuration data queue means to be stored in said coprocessor core means, replacing said current configuration data.

Viewed from a third aspect, the present invention provides a method of carrying out data processing operations on behalf of a main data processing apparatus, said method comprising the steps of: performing said data processing operations in a coprocessor core in dependence on current configuration data stored in said coprocessor core, said current configuration data being associated with a current processing session; receiving by a reset controller pending configuration data from said main data processing apparatus, said pending configuration data associated with a pending processing session; storing said pending configuration data in a configuration data queue in said reset controller; and causing said coprocessor core to reset using said reset controller, wherein when said coprocessor core is reset, transferring said pending configuration data from said configuration data queue to said coprocessor core, replacing said current configuration data.

BRIEF DESCRIPTION OF THE DRAWINGS

The present invention will be described further, by way of example only, with reference to embodiments thereof as illustrated in the accompanying drawings, in which.

DESCRIPTION OF NON-LIMITING EXAMPLE EMBODIMENTS

Figure 1:
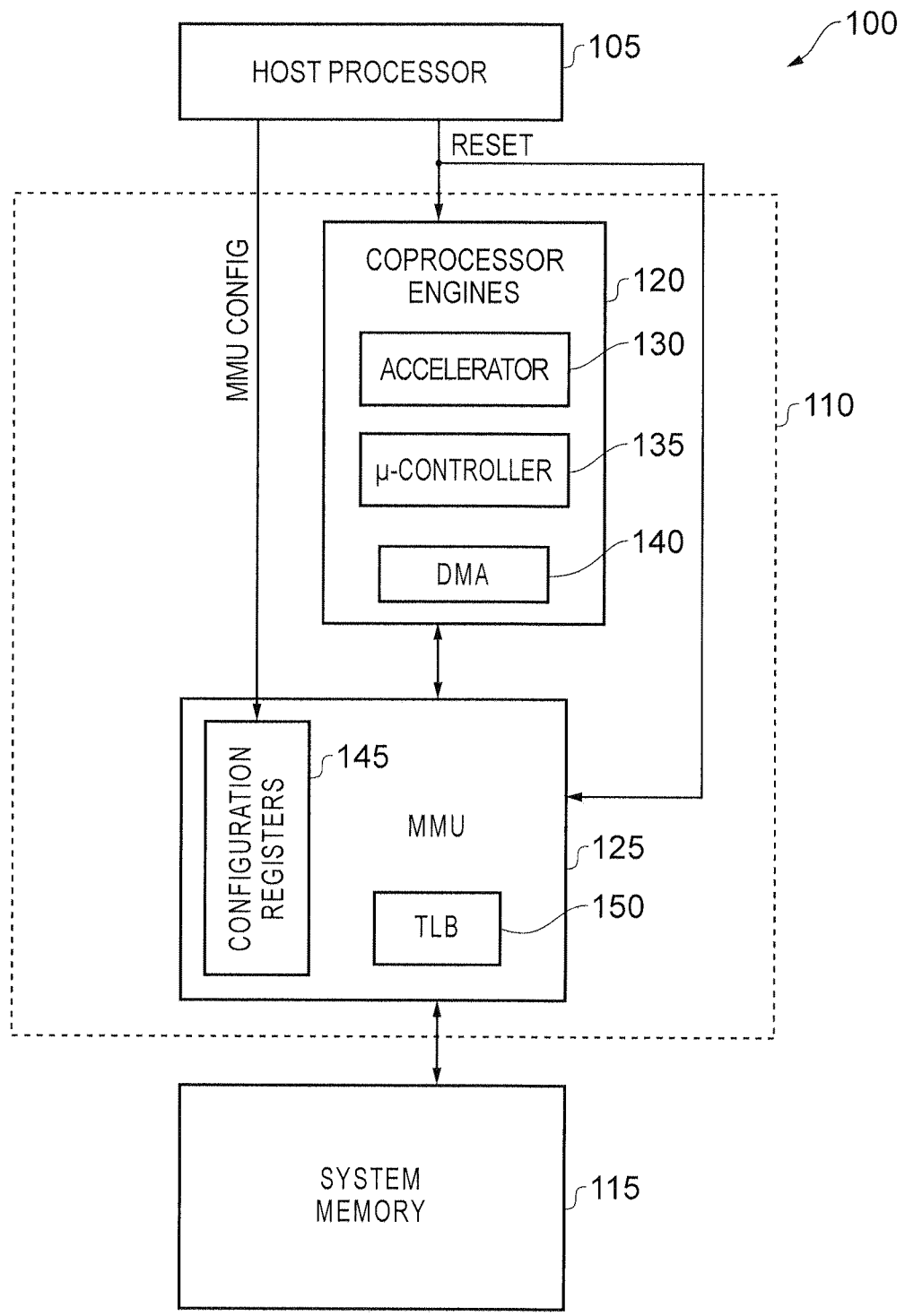
FIG. 1 schematically illustrates a prior art data processing system, comprising a host processor and a coprocessor.
Figure 2:
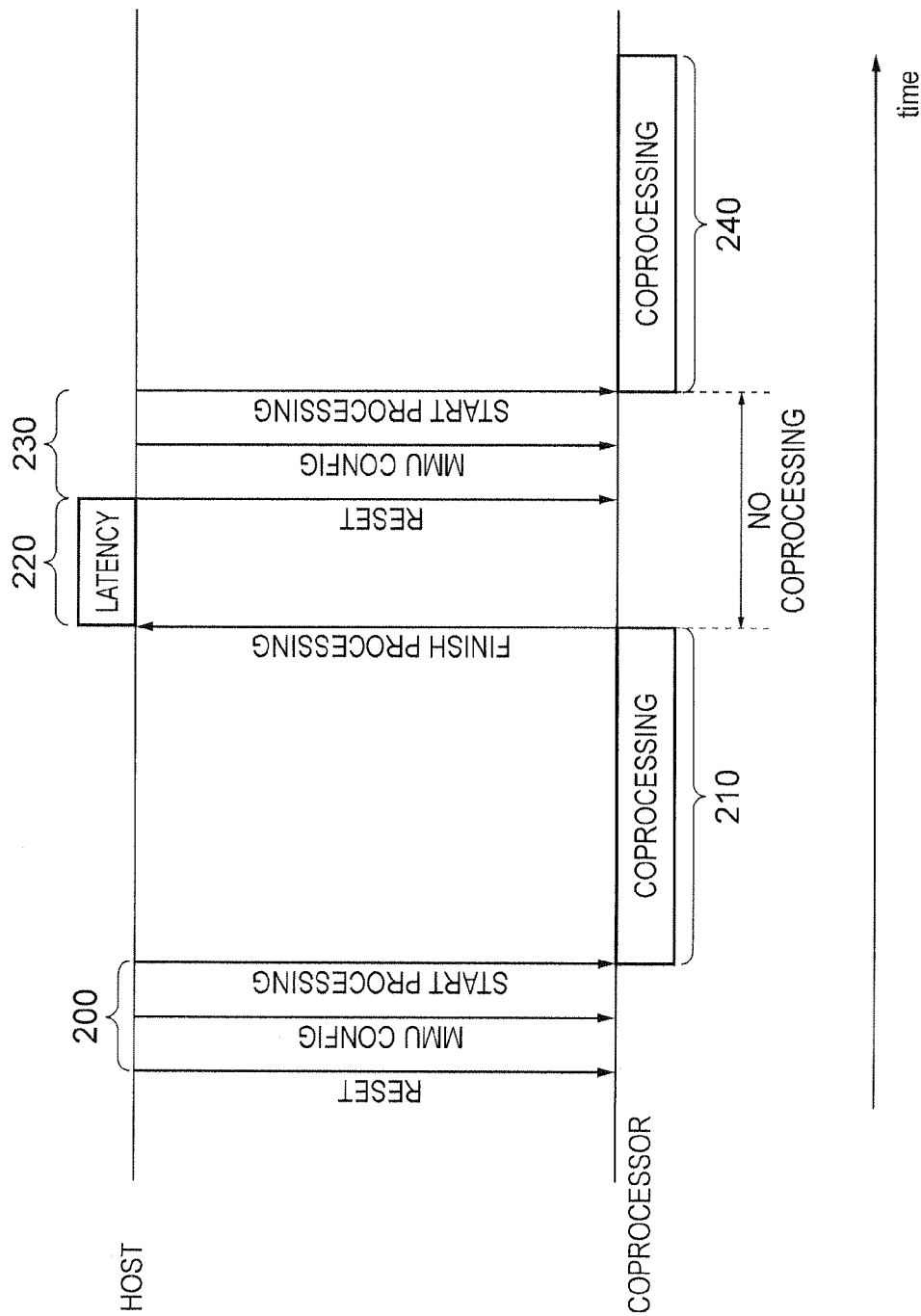
FIG. 2 schematically illustrates various signals and timings when a prior art coprocessor is reset by a host processor.
Figure 3:
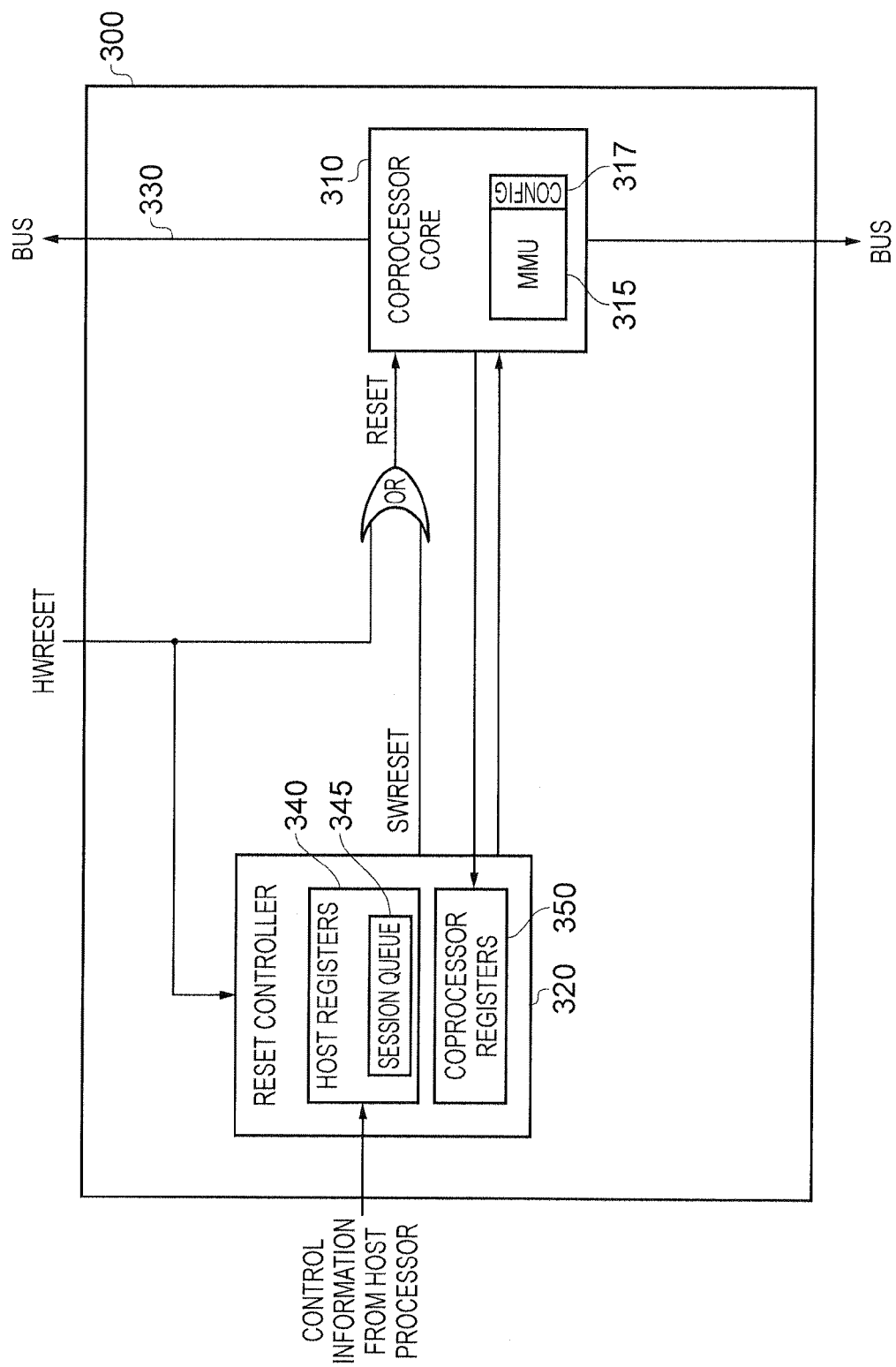
FIG. 3 schematically illustrates a coprocessor.

FIG. 3 schematically illustrates a coprocessor according to one embodiment. The coprocessor 300 comprises coprocessor core 310 and reset controller 320. Coprocessor core 310 is connected to bus 330 via which it may (acting as a bus master) access system memory and (acting as a bus slave) respond to instructions or requests from the main processor. Amongst other components coprocessor core 310 comprises memory management unit (MMU) 315, which is arranged to convert virtual addresses used within coprocessor core 310 into physical addresses used to access external memory. The MMU 315 performs these translations with reference to a page table in external memory, which provides the mapping between virtual and physical addresses, and also provides permission information indicating, for example, data areas which are read only, or data areas that may also be written to. The manner in which the MMU 15 works is dependent on the values stored in configuration registers 317. In particular, configuration registers 317 store a page table base address indicating the address at which the page table in external memory starts. The configuration of MMU 315 (by means of configuration registers 317) is controlled by the host processor of the data processing system, since this configuration defines which areas of memory are accessible at any given time to coprocessor core 310.

Configuration data to be stored in configuration registers 317 is received by coprocessor 300 from the host processor and stored within host registers 340, which form part of reset controller 320. In particular, this configuration data is stored in session queue 345, which forms part of host registers 340. Host registers 340 are only accessible to the host processor, and cannot be accessed or modified by coprocessor 300. Whilst a current set of configuration data is stored in configuration registers 317, defining the manner in which MMU 315 operates, the host processor is able to write a pending set of configuration data into session queue 345, such that this configuration data is queued up, waiting to be transferred to configuration registers 317 of MMU 315 in coprocessor core 310.

Reset controller 320 is configured to be able to reset coprocessor core 310. During normal operation when coprocessor core 310 finishes a processing session, reset controller 320 is arranged to cause coprocessor core 310 to reset and to transfer any configuration data stored in session queue 345 to coprocessor core 310. The reset controller 320 causes coprocessor core 310 to reset by asserting the signal SWRESET. In fact resetting the coprocessor core 310 comprises a process of asserting and then deasserting the SWRESET signal, as is described below with reference to FIG. 6. The coprocessor core 310 may also be reset by hardware reset signal HWRESET (note that the signal RESET is generated by SWRESET "OR" HWRESET). Coprocessor core 310 is arranged, on receipt of the reset signal, to flush any temporarily stored data (for example the contents of a translation lookaside buffer (TLB) in MMU 315, as well as the contents of any level one caches provided in the core).

Reset controller 320 further comprises coprocessor registers 350, which are accessible to coprocessor core 310, such that some degree of control over reset controller 320 may be exerted by coprocessor core 310. For example, coprocessor core 310 may request its own reset, by writing to a register amongst coprocessor registers 350 defined for this purpose.

Figure 4:
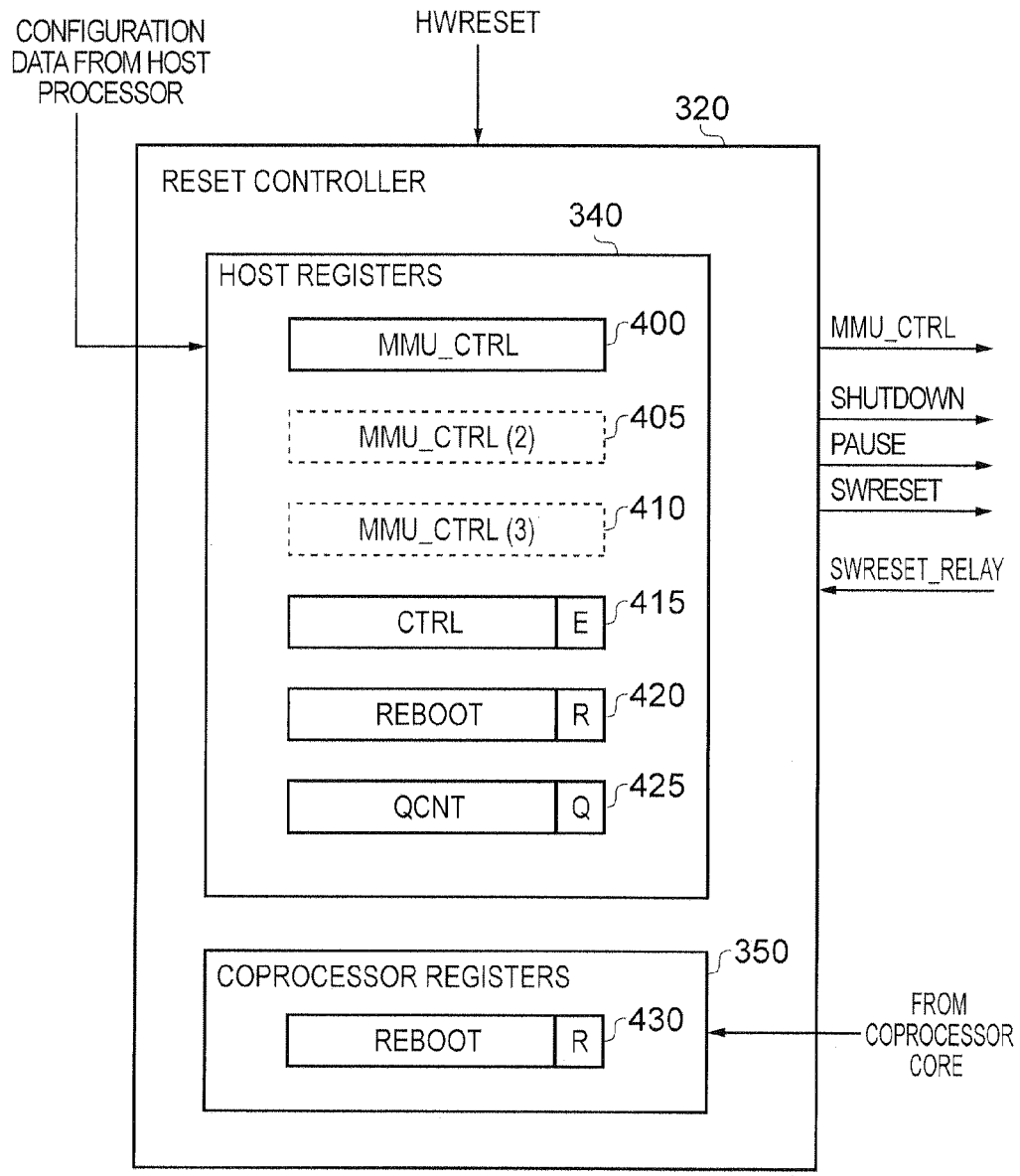
FIG. 4 schematically illustrates a reset controller.

Further detail of reset controller 320 is illustrated in FIG. 4. Host registers 340 comprise the registers MMU_CTRL 400, CTRL 415, REBOOT 420 and QCNT 425. The coprocessor registers 350, in this embodiment, comprise a single REBOOT register 430. Configuration data received from the host processor is written to the appropriate register within host registers 340. MMU_CTRL register 400 stores the control information required to reconfigure the MMU 315 in coprocessor core 310. Hence, MMU_CTRL 400 provides a session queue, such that configuration data for a pending processing session in coprocessor core 310 may be stored in reset controller 320, prior to being passed to coprocessor core 310 when it is reset. As illustrated in FIG. 4, the session queue may be configured to queue up a number of sets of configuration data for coprocessor core 310. MMU_CTRL (2) 405 and MMU_CTRL (3) 410 provide two further entries in the session queue in which configuration data may be queued up. The host registers 340 also comprised CTRL 415 in which an enable bit E may be set in order to enable/disable the resetting of coprocessor core 310 by reset controller 320. The register REBOOT 420 comprises a bit R, which may be set by the host processor to indicate that the coprocessor core 310 should be reset. The register QCNT 425 comprises a bit (or bits) Q which is used to indicate whether (or how many) configuration data are stored in the MMU_CTRL register(s). REBOOT register 430 is similarly configured to REBOOT register 420, having a bit R, which the coprocessor core may set to indicate that the coprocessor core is requesting its own reset. The reset controller 320 also has an input HWRESET, which provides a mechanism for hard resetting both the reset controller 320 and (see FIG. 3) resetting coprocessor core 310. Reset controller 320 is configured to output the signals MMU_CTRL, SHUTDOWN, PAUSE and SWRESET, as well as to receive the signal SWRESET_READY. These signals are described in more detail with reference to FIG. 5.

Figure 5:
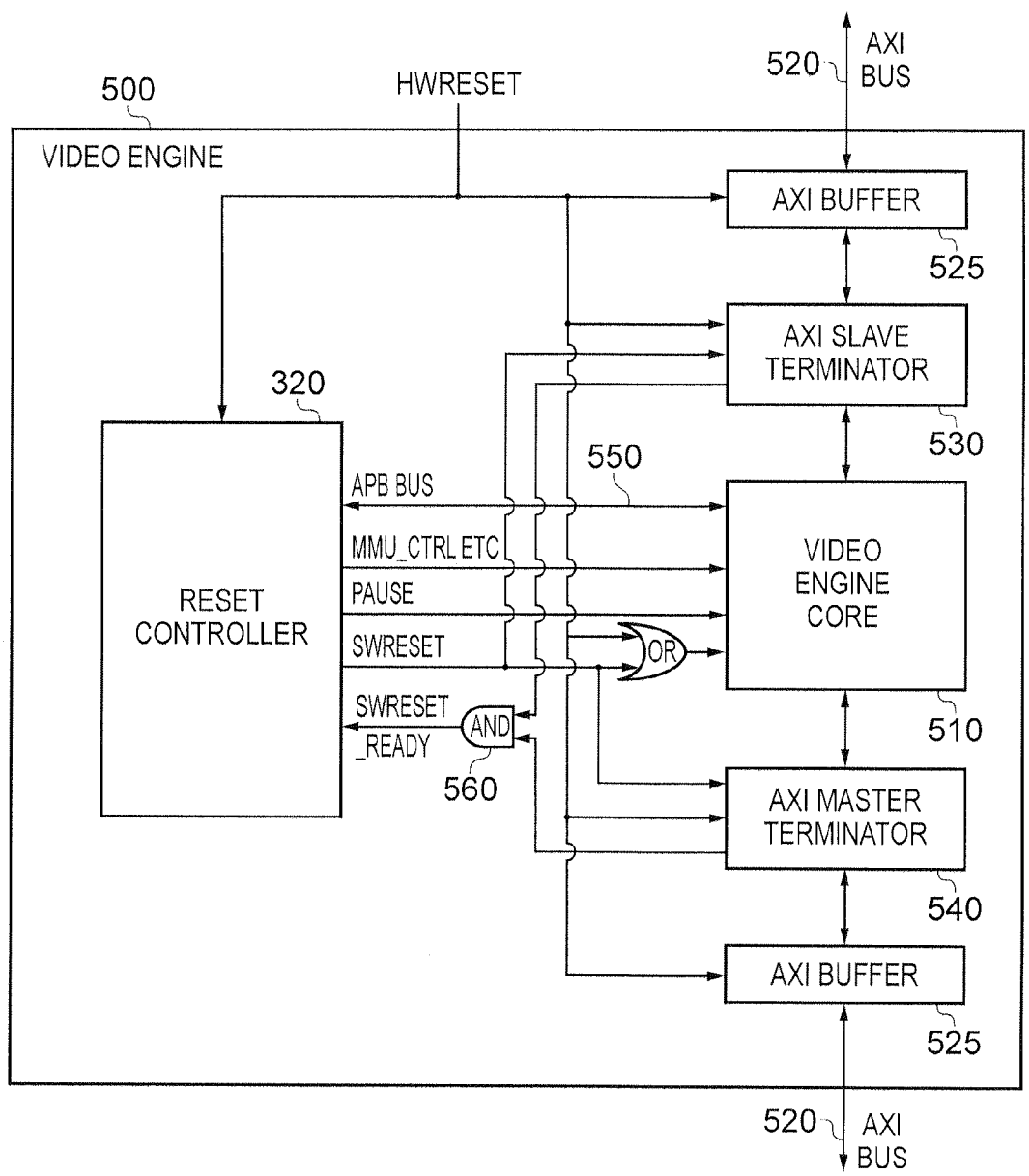
FIG. 5 schematically illustrates a video engine acting as coprocessor.

FIG. 5 schematically illustrates an example of a coprocessor 300, in this embodiment being a video engine 500, configured to perform video data processing tasks on behalf of a host processor. Reset controller 320 is configured as described above with reference to FIG. 4. Coprocessor core 310, in this embodiment, is video engine core 510. Video core engine 510 is configured to communicate with other components of the data processing system via bus 520, which this embodiment is an AXI bus (as provided by ARM Limited, Cambridge, UK). The video engine 500 further comprises AXI buffers 525, and a AXI slave terminator 530 and AXI master terminator 540. The AXI buffers 525 provide the interface to the AXI bus 520.

Communication between reset controller 320 and video engine core 510 is provided by advanced peripheral bus (APB) 550 (as provided by ARM Limited, Cambridge, UK). During normal operation when a processing session in video engine core 510 completes, the video engine core 510 signals this fact to reset controller 320 via APB bus 550. The reset controller 320 is configured then to assert/deassert the signal SWRESET to cause a video engine core 510 to reset and to provide the new configuration data for the next processing session in video engine core 510 (e.g. MMU_CTRL). The reset controller 320 is further configured to assert the signal PAUSE to inhibit processing by video engine core 510. When a new processing session is ready to be started, PAUSE is deasserted.

AXI slave terminator 530 and AXI master terminator 540 are provided such that the video engine 500 can cope with the situation when reset controller 320 wishes to cause video engine core 510 to reset, whilst there are still bus transactions on AXI bus 520 that are pending. For example video engine 500 may have received a data read request from the host processor on AXI bus 520, but not yet have responded when the reset controller wishes to reset video engine core 510. Similarly the video engine core 510 itself may for example have issued a data write request on AXI bus 520 to external memory, which may have not completed by the time the reset is required. Hence, AXI slave terminator 530 and AXI master terminator 540 are configured, when the signal SWRESET is asserted by reset controller 320, to identify any pending bus transactions and to intervene in those pending bus transactions, causing them to be cleanly terminated. For example AXI slave terminator 530 may issue dummy read data to the host processor, indicating that the pending reads will not complete. Similarly AXI master terminator 540 may issue command signals to external memory indicating that the requested data to be read from external memory need not normally complete. Once AXI slave terminator 530 and AXI master terminator 540 have cleanly terminated all pending bus transactions, each asserts a signal which (via AND gate 560) forms the signal SWRESET_READY received by reset controller 320. On receipt of this signal reset controller 320 allows the resetting of video engine 510 to complete by deasserting SWRESET, and if new configuration data is stored in the host registers 340 of the reset controller 320, to transfer this new configuration data to video engine core 510. When PAUSE is deasserted, this new configuration data is then acted upon. The AXI buffers 525, AXI slave terminator 530 and AXI master terminator 540 are also configured to receive the HWRESET signal, such that when this hard reset signal is received, the same process of pending bus transaction termination may be carried out.

Figure 6:
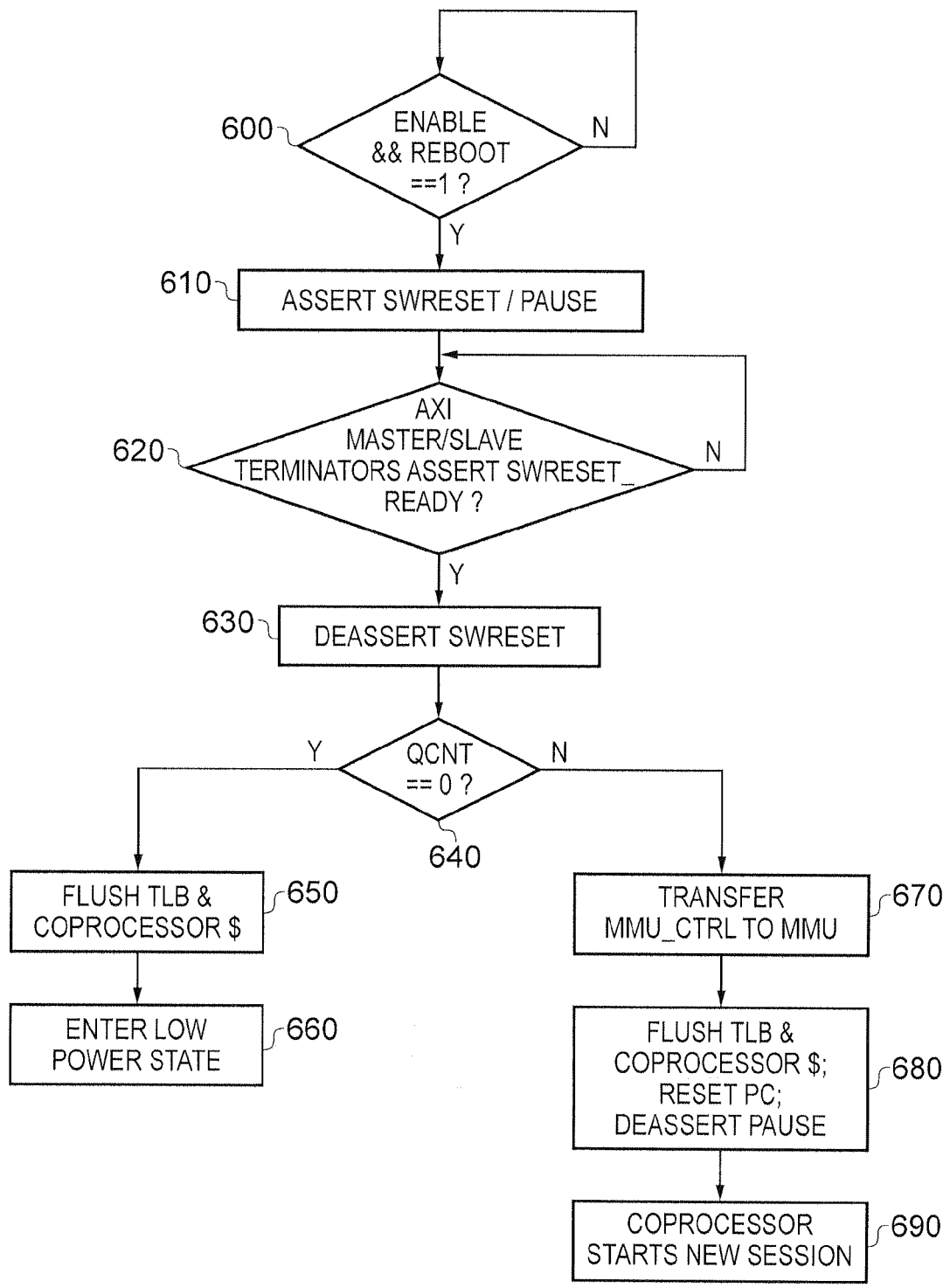
FIG. 6 schematically illustrates a series of steps taken in one embodiment.

FIG. 6 schematically illustrates a series of steps taken in one embodiment. At step 600, within reset controller 320 it is continually determined if a REBOOT is requested (i.e. if bit R in REBOOT register 420 or REBOOT register 430 is set) and if resetting is currently enabled (i.e. if bit E is set in CTRL register 415). When this is true, the flow proceeds to step 610 where reset controller 320 asserts the signals SWRESET and PAUSE. Then at step 620 the reset controller 320 waits until the AXI master/slave terminators 530 and 540 have both terminated all pending bus transactions and thus caused the signal SWRESET_READY to be asserted. Once this is the case, the signal SWRESET is deasserted at step 630. At step 640 it is determined if any configuration data is queued, ready for a pending process, this being indicated by the content of QCNT register 425. If there is no pending processing session and thus QCNT=0, the flow proceeds to step 650, where any temporary data stored in the coprocessor core associated with the previous processing session is flushed. For example, the contents of the TLB in the MMU and the content of any caches provided within the coprocessor core are flushed. The flow then proceeds to step 660 where the coprocessor core is caused to enter a low power state, in which it will remain until required to perform further data processing operations on behalf of the main processor. If however at step 640 it is determined that QCNT is not equal to 0, i.e. there is configuration data queued in the reset controller ready for setting up a pending processing session in the coprocessor, the flow proceeds to step 670, where the contents of MMU_CTRL register 400 are transferred to the coprocessor core to configure the MMU. At step 680 temporary data stored in the coprocessor core associated with the previous processing session is flushed, the contents of the TLB and any local caches being flushed. Also at step 680, the program counter PC is reset to a predetermined value associated with the pending processing session. The final act at step 680 is to deassert PAUSE, such that at step 690 the coprocessor starts the new processing session thus configured.

Figure 7:
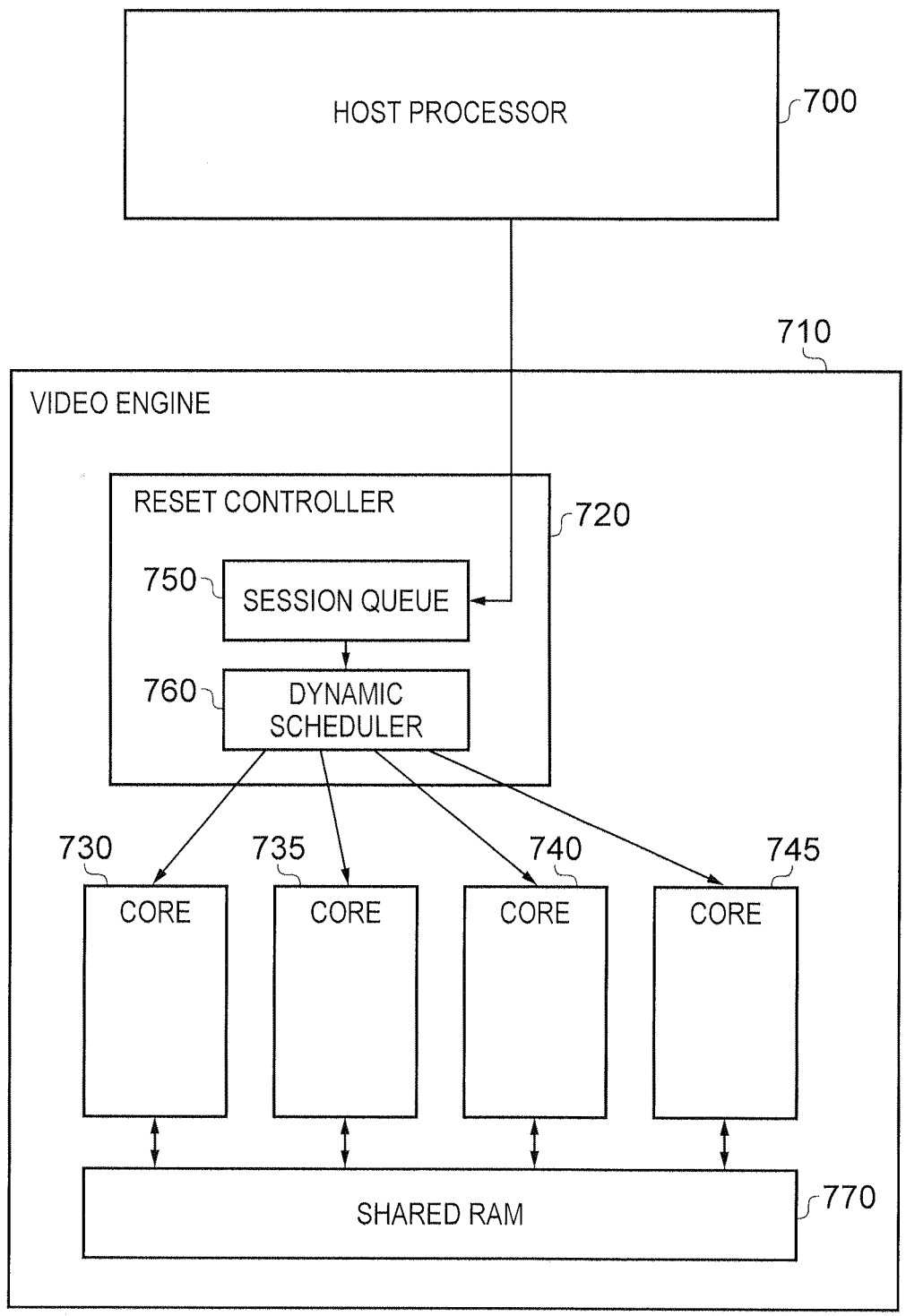
FIG. 7 schematically illustrates a multi-core video engine.

FIG. 7 schematically illustrates another embodiment, in which a host processor 700 delegates video processing tasks to multi-core video engine 710. Multi-core video engine 710 comprises a reset controller 720 and four coprocessor cores 730, 735, 740 and 745. Reset controller 720 is configured in essentially the same manner as previously described reset controller 320 (see FIGS. 3, 4 and 5), having a session queue 750, with the addition of dynamic scheduler 760. A pending processing session queued in the session queue 750 is dynamically allocated to whichever of the four coprocessor cores is next available by the dynamic scheduler 760. In this way, despite the presence of four coprocessor cores, the session queue 750 may still be a single entry queue. In other embodiments the session queue 750 may be a multiple entry session queue as described with reference to FIG. 4. The multi-core video engine 710 further comprises a shared RAM 770, to which each of the coprocessor cores 730, 735, 740 and 745 have access, so that they may exchange data. The reset controller 720 is configured to be able to assert the various control signals (PAUSE, SWRESET, SHUTDOWN) independently to each coprocessor core, and to receive the SWRESET_READY signal separately from each processor core, such that each of the four coprocessor cores may be controlled as described for the signal coprocessor core 510 in FIG. 5.

Although particular embodiments of the invention have been described herein, it will be apparent that the invention is not limited thereto, and that many modifications and additions may be made within the scope of the invention. For example, various combinations of the features of the following dependent could be made with the features of the independent claims without departing from the scope of the present invention.

We claim:

1. A data processing apparatus configured to carry out data processing operations on behalf of a main data processing apparatus, said data processing apparatus comprising:
 a coprocessor core configured to perform said data processing operations, in dependence on current configuration data stored in said coprocessor core, said current configuration data being associated with a current processing session; and
 a reset controller configured to cause said coprocessor core to reset,
 wherein said reset controller is configured to receive, before said current processing session is completed, pending configuration data from said main data processing apparatus, said pending configuration data associated with a pending processing session, and to store said pending configuration data in a configuration data queue, and
 wherein said reset controller is configured, when said coprocessor core resets prior to starting said pending processing session, to transfer said pending configuration data from said configuration data queue to be stored in said coprocessor core, replacing said current configuration data.

2. A data processing apparatus as claimed in claim 1, wherein said current configuration data comprises a current page table base address, and said coprocessor core comprises a memory management unit configured to perform a translation of a virtual address issued by said coprocessor core into a physical address for accessing memory, said translation being performed in dependence on said current page table base address stored in a configuration register of said memory management unit, and said pending configuration data comprises a pending page table base address.

3. A data processing apparatus as claimed in claim 1, wherein said configuration data queue is configured to store a sequence of pending configuration data.

4. A data processing apparatus as claimed in claim 1, wherein after being reset said coprocessor core is configured to begin said pending processing session, using said pending configuration data as new current configuration data.

5. A data processing apparatus as claimed in claim 1, wherein said pending configuration data comprises a pending program counter for initialising said pending processing session.

6. A data processing apparatus as claimed in claim 1, wherein said configuration data comprises further memory management unit configuration data.

7. A data processing apparatus as claimed in claim 1, wherein said reset controller is configured to cause coprocessor state associated with said current processing session to be flushed when said coprocessor is reset.

8. A data processing apparatus as claimed in claim 2, wherein said reset controller is configured to cause content of an internal storage unit in said memory management unit to be flushed when said coprocessor is reset, said internal storage unit configured to store indications of virtual to physical address translations previously performed by said memory management unit.

9. A data processing apparatus as claimed in claim 7, wherein said coprocessor state comprises content of a coprocessor cache.

10. A data processing apparatus as claimed in claim 1, wherein said data processing apparatus is connected to a bus for data communication and wherein said data processing apparatus further comprises at least one bus transaction terminator, said at least one bus transaction terminator configured, when a reset of said coprocessor is requested, to identify any ongoing bus transactions associated with said current processing session and to terminate said ongoing bus transactions.

11. A data processing apparatus as claimed in claim 10, wherein said at least one bus transaction terminator comprises a slave bus terminator and a master bus terminator.

12. A data processing apparatus as claimed in claim 10, wherein said reset controller is configured, when said coprocessor is reset, to wait for a termination signal from said at least one bus transaction terminator, said termination signal indicating that all ongoing bus transactions associated with said current processing session have been terminated, before allowing said coprocessor to start said pending processing session.

13. A data processing apparatus as claimed in claim 1, wherein said reset controller comprises at least one control register accessible to said main data processing apparatus and not accessible to said coprocessor core.

14. A data processing apparatus as claimed in claim 13, wherein said at least one control register is configured to selectively enable resetting of said coprocessor core.

15. A data processing apparatus as claimed in claim 13, wherein said at least one control register is configured to selectively indicate that said coprocessor core should be reset.

16. A data processing apparatus as claimed in claim 13, wherein said at least one control register is configured to selectively indicate that said configuration data queue contains at least one set of pending configuration data.

17. A data processing apparatus as claimed in claim 1, wherein said reset controller comprises at least one control register accessible to said coprocessor core.

18. A data processing apparatus as claimed in claim 17, wherein said at least one control register is configured to selectively indicate that said coprocessor core should be reset.

19. A data processing apparatus as claimed in claim 1, wherein said reset controller is configured, if a reset of said coprocessor core is requested and said configuration data queue contains no pending configuration data, to cause said coprocessor core to enter a low power mode.

20. A data processing apparatus as claimed in claim 1, wherein said coprocessor core comprises at least one of: an accelerator unit, a microcontroller and a direct memory access unit.

21. A data processing apparatus as claimed in claim 1, wherein said data processing apparatus is a video engine configured to perform video data processing operations.

22. A data processing apparatus as claimed in claim 1, said data processing apparatus comprising a plurality of coprocessor cores configured to perform said data processing operations, wherein said reset controller is configured to cause said plurality of coprocessor cores individually to reset.

23. A data processing apparatus as claimed in claim 22, wherein said reset controller further comprises a dynamic scheduler, said dynamic scheduler configured to transfer said pending configuration data from said configuration data queue to be stored in a next available coprocessor core of said plurality of coprocessor cores.

24. A data processing apparatus as claimed in claim 1, wherein said coprocessor core is further configured to be reset in response to a hardware reset signal not originating from said reset controller.

25. A data processing apparatus configured to carry out data processing operations on behalf of a main data processing apparatus, said data processing apparatus comprising:
coprocessor core means for performing said data processing operations, in dependence on current configuration data stored in said coprocessor core means, said current configuration data being associated with a current processing session; and
reset controller means for causing said coprocessor core means to reset,
wherein said reset controller means is configured to receive, before said current processing session is completed, pending configuration data from said main data processing apparatus, said pending configuration data associated with a pending processing session, and to store said pending configuration data in a configuration data queue means, and
wherein said reset controller means is configured, when said coprocessor core means resets prior to starting said pending processing session, to transfer said pending configuration data from said configuration data queue means to be stored in said coprocessor core means, replacing said current configuration data.

26. A method of carrying out data processing operations on behalf of a main data processing apparatus, said method comprising the steps of:
performing said data processing operations in a coprocessor core in dependence on current configuration data stored in said coprocessor core, said current configuration data being associated with a current processing session;
receiving by a reset controller, before said current processing session is completed, pending configuration data from said main data processing apparatus, said pending configuration data associated with a pending processing session;
storing said pending configuration data in a configuration data queue in said reset controller; and
causing said coprocessor core to reset using said reset controller, wherein when said coprocessor core is reset prior to starting said pending processing session, transferring said pending configuration data from said configuration data queue to said coprocessor core, replacing said current configuration data.

* * * * *